(12) United States Patent
Kim et al.

(10) Patent No.: US 11,187,211 B2
(45) Date of Patent: Nov. 30, 2021

(54) ENERGY SUPPLY SYSTEM

(71) Applicant: INTERTECH Co., Ltd., Jeju-si (KR)

(72) Inventors: Jong Woo Kim, Jeju-si (KR); Yeon Ju Lim, Jeju-si (KR); Dae Young Kim, Jeju-si (KR)

(73) Assignee: INTERTECH Co., Ltd., Jeju-si (KR)

(*) Notice: Subject to any disclaimer, the term of this patent is extended or adjusted under 35 U.S.C. 154(b) by 0 days.

(21) Appl. No.: 17/066,165

(22) Filed: Oct. 8, 2020

(65) Prior Publication Data
US 2021/0140411 A1 May 13, 2021

(30) Foreign Application Priority Data

Nov. 7, 2019 (KR) .......................... 10-2019-0141424

(51) Int. Cl.
*F03G 7/04* (2006.01)
*H02S 40/38* (2014.01)
*F24T 50/00* (2018.01)
*F24V 99/00* (2018.01)
*F03G 6/00* (2006.01)

(52) U.S. Cl.
CPC ............. *F03G 7/04* (2013.01); *F03G 6/001* (2013.01); *F24T 50/00* (2018.05); *F24V 99/00* (2018.05); *H02S 40/38* (2014.12)

(58) Field of Classification Search
CPC ......... F03G 6/00–068; F03G 2006/006; F03G 2006/008; F03G 2006/061; F03G 2006/062; F03G 7/04; H01L 31/042; H01L 31/04; H02S 40/38; F24V 99/00
See application file for complete search history.

(56) References Cited

U.S. PATENT DOCUMENTS 3,890,787 A * 6/1975 Margen .................. F24D 10/00
  60/648
4,006,857 A * 2/1977 Adrian ................. F01K 17/005
  237/2 B (Continued)

FOREIGN PATENT DOCUMENTS

JP    2008-039306 A    2/2008
KR    10-0893828 B1    4/2009

(Continued)

*Primary Examiner* — Mark A Laurenzi
*Assistant Examiner* — Mickey H France
(74) *Attorney, Agent, or Firm* — Studebaker & Brackett PC

(57) ABSTRACT

Disclosed is an energy supply system using hot waste water that controls a supply of energy required according to a situation of agricultural facilities. The energy supply system includes a hot waste water pipe connecting a power plant and at least one facility so as to supply thermal energy to the at least one facility through hot waste water discharged from the power plant; a ground heat exchanger buried under a ground and connected to the at least one facility so as to supply geothermal energy to the at least one facility; at least one solar cell module disposed in the at least one facility and supplying electric energy to the at least one facility; and a server configured to individually control the thermal energy, the geothermal energy and the electrical energy supplied to the at least one facility according to an environmental state of the at least one facility.

11 Claims, 13 Drawing Sheets

(56) References Cited

U.S. PATENT DOCUMENTS

| | | | | |
|---|---|---|---|---|
| 4,168,030 A * | 9/1979 | Timmerman | ........... | F01K 9/003 165/120 |
| 6,311,490 B1 | 11/2001 | Conrad | | |
| 8,955,763 B2 * | 2/2015 | Zirkiyev | ............ | G05D 23/1923 237/8 A |
| 2008/0150296 A1 * | 6/2008 | Fein | ........................ | F03D 9/25 290/1 R |
| 2008/0154801 A1 * | 6/2008 | Fein | ........................ | E01C 11/26 705/412 |
| 2010/0000596 A1 * | 1/2010 | Mackler | ................... | H02S 40/32 136/246 |
| 2010/0219983 A1 * | 9/2010 | Peleg | ................ | H02J 13/00016 340/870.17 |
| 2010/0318297 A1 * | 12/2010 | Herzig | ................ | H02J 13/0062 702/3 |
| 2013/0056993 A1 * | 3/2013 | Newcomb | ................. | H02J 3/40 290/1 R |
| 2013/0205778 A1 * | 8/2013 | Hansen | ..................... | F03G 7/04 60/641.8 |
| 2014/0005844 A1 * | 1/2014 | Newcomb | ................. | F03D 9/008 700/287 |
| 2014/0260247 A1 * | 9/2014 | Marble | ..................... | F03G 7/04 60/641.2 |
| 2014/0284275 A1 * | 9/2014 | Boccato | ................. | A61M 1/166 210/645 |
| 2014/0353975 A1 * | 12/2014 | Newcomb | ............... | F01D 15/00 290/54 |
| 2015/0113987 A1 * | 4/2015 | Mackler | ................... | F03D 9/007 60/641.2 |
| 2016/0241036 A1 * | 8/2016 | Wolter | .................... | H02S 20/10 |
| 2016/0281607 A1 * | 9/2016 | Asati | ....................... | F01K 13/00 |
| 2016/0306906 A1 * | 10/2016 | McBrearty | .............. | H02S 50/10 |
| 2017/0102675 A1 * | 4/2017 | Drees | ................. | G05B 13/0205 |
| 2017/0104449 A1 * | 4/2017 | Drees | ..................... | H02J 3/382 |
| 2017/0205103 A1 * | 7/2017 | Newcomb | ........... | H02K 7/1853 |
| 2017/0308628 A1 * | 10/2017 | Son | .......................... | G06F 30/20 |
| 2018/0196901 A1 * | 7/2018 | McBrearty | .............. | H02J 3/381 |
| 2020/0409325 A1 * | 12/2020 | Silva | ....................... | H02S 10/10 |
| 2021/0071915 A1 * | 3/2021 | Kim | ........................ | F24T 50/00 |
| 2021/0140411 A1 * | 5/2021 | Kim | ........................... | F03G 7/04 |

FOREIGN PATENT DOCUMENTS

| | | |
|---|---|---|
| KR | 10-2013-0003191 A | 1/2013 |
| KR | 10-2013-0062963 A | 6/2013 |
| KR | 10-1286578 B1 | 7/2013 |
| KR | 10-1378205 B1 | 3/2014 |
| KR | 10-2018-0007081 A | 1/2018 |
| KR | 10-2019-0064354 A | 6/2019 |

* cited by examiner

ENERGY SUPPLY SYSTEM

CROSS-REFERENCE TO RELATED APPLICATIONS

This application claims priority to and the benefit of Korean Patent Application No. 10-2019-0141424 filed on Nov. 7, 2019, the disclosure of which is incorporated herein by reference in its entirety.

BACKGROUND

Technical Field

The present disclosure relates to an energy supply system for efficiently supplying various types of energy used in agricultural facilities and the like.

Background Art

In recent years, agriculture industries around the world are moving toward using advanced science technology that uses electric energy rather than using natural farming methods to increase added value.

Agricultural facilities have been changed to have a system that grows agricultural products and flowers all through the year by overcoming seasons and times by using temperature controllers and electric lighting, and the like. The consumption of electric energy used in agricultural facilities are increasing with expansion of the spread of electric dryers, air conditioners and the like. The increasing consumption of electric energy used in agricultural facilities weakens competitiveness of farms.

To reduce costs of electric energy used in agricultural facilities, studies are being conducted to reduce heating costs by using hot waste water. In addition, to utilize solar energy, which is renewable energy, solar cell modules are being supplied to farms.

However, when a certain amount of hot waste water is fixedly transferred from a power plant to an agricultural facility located at a distance from the plant, there is a problem in that sufficient heat energy is not supplied or excessive heat energy beyond necessary energy is supplied according to a situation of the agricultural facility.

In addition, when electric energy generated by the solar cell module is less than electric energy used in agricultural facilities, the electric energy should be supplied from the power plant, which is a burden on the farms.

SUMMARY

The present disclosure is to solve the above problems, and provides an energy supply system that efficiently supplies energy required for agricultural facilities according to a situation of the agricultural facilities.

The technical problems to be solved in this specification are not limited to the technical problems mentioned above, and other technical problems to be solved will be clearly understood by the skilled person in the art from the following description.

According to an aspect of the present disclosure, an energy supply system may include a hot waste water pipe connecting a power plant and at least one facility so as to supply thermal energy to the at least one facility through hot waste water discharged from the power plant; a ground heat exchanger buried under a ground and connected to the at least one facility so as to supply geothermal energy to the at least one facility; at least one solar cell module disposed in the at least one facility and supplying electric energy to the at least one facility; and a server configured to individually control the thermal energy, the geothermal energy and the electrical energy supplied to the at least one facility according to an environmental state of the at least one facility.

The energy supply system may further include a control valve disposed on the hot waste water pipe and controlling a flow rate of the hot waste water, and the server may be electrically connected to the control valve and control the control valve to thereby control the flow rate of the hot waste water supplied to the at least one facility.

The hot waste water pipe may include a first transfer pipe through which the hot waste water discharged from the power plant is transferred; a second transfer pipe which is branched from the first transfer pipe and connected to the at least one facility, and on which the control valve is disposed; and a recovery pipe which transfers the hot waste water recovered from the at least one facility to the power plant.

The server may include a first communication device transmitting and receiving an electrical signal in a wired or wireless manner; a control device controlling an electrical signal transmitted or received through the first communication device; and an energy storage system storing the electrical signal controlled by the control device.

The energy supply system may further include a second communication device disposed in the at least one facility and transmitting and receiving an electrical signal to and from the first communication device of the server in a wired or wireless manner.

The energy supply system may further include a sensor disposed in the at least one facility and sensing information on an environmental state inside the at least one facility to convert it into an electrical signal, and the second communication device may transmit the electrical signal according to the sensor to the first communication device of the server.

The second communication device may receive a control signal for controlling the control valve by the server and transmit the control signal to the control valve.

The energy supply system may further include an energy storage system electrically connected to the second communication device and storing electrical energy generated by the at least one solar cell module.

The energy storage system may receive electric energy of the power plant.

The second communication device may transmit a value of an amount of the electric energy stored in the energy storage system to the first communication device of the server, and when the value of the amount of the electrical energy stored in the energy storage system is less than a value of a predetermined amount of electrical energy, the first communication device of the server may transmit an electrical signal for supplying the electrical energy of the power plant to the energy storage system, to the power plant.

The ground heat exchanger may include a heat exchange pipe which is buried under the ground and in which a heating medium flows; and a plurality of heat exchange fins coupled to the heat exchange pipe and disposed to be spaced apart from each other along a direction in which the heat exchange pipe extends.

According to an exemplary embodiment of the present disclosure, since the server individually controls thermal energy, geothermal energy and electric energy supplied to agricultural facilities according to environmental conditions of the agricultural facilities, energy supply efficiency used in the agricultural facilities is improved.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF EMBODIMENTS

Figure 1:
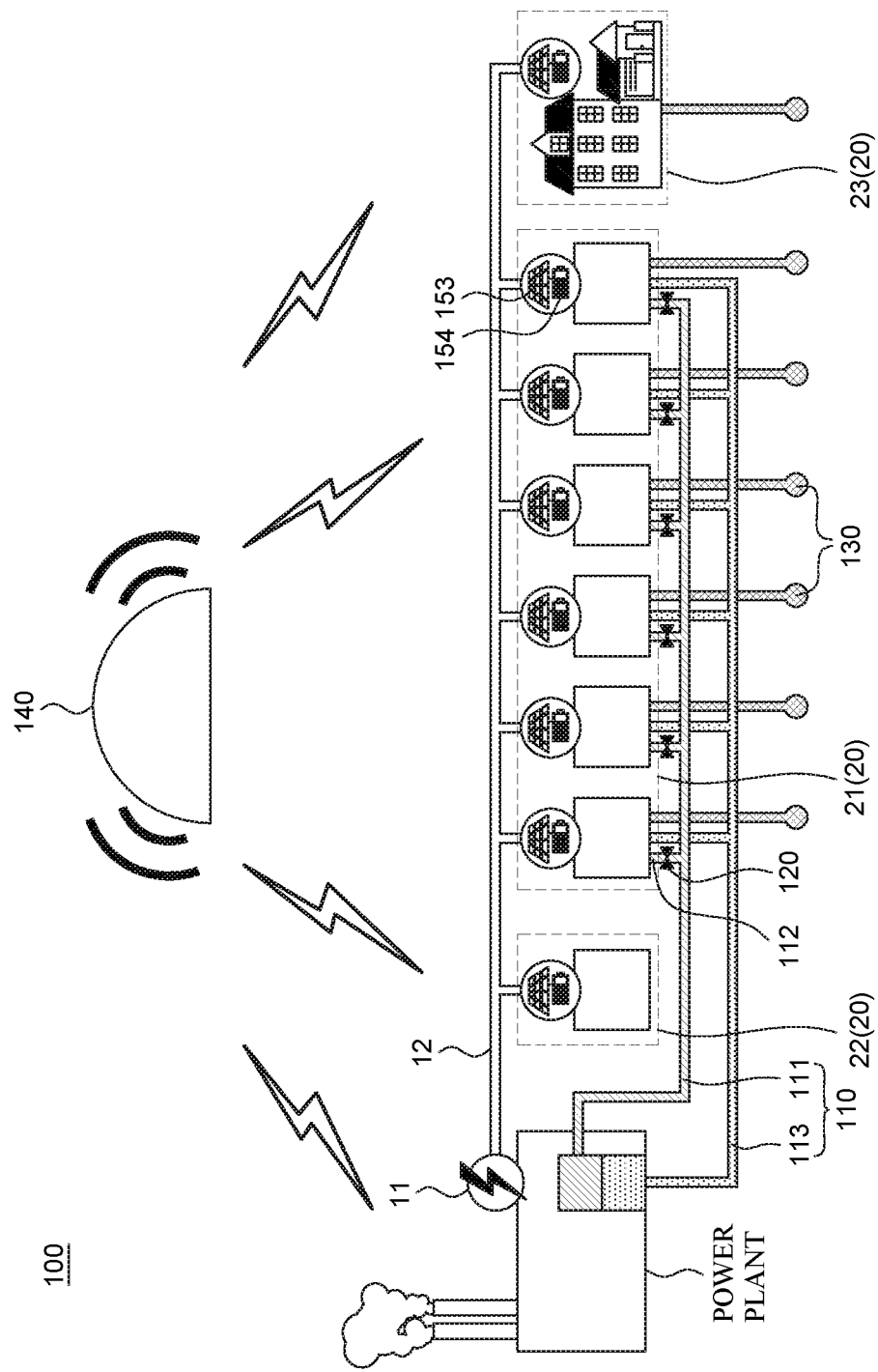
FIG. 1 is a diagram schematically illustrating an energy supply system using hot waste water according to an exemplary embodiment of the present disclosure.

Hereinafter, various embodiments will be described in more detail with reference to the accompanying drawings. The embodiments may be variously modified. Specific embodiments may be depicted in the drawings and concretely explained in the detailed description. However, specific embodiments disclosed in the accompanying drawings are only intended to facilitate understanding of various embodiments. Therefore, it is not intended to limit the technical idea to the specific embodiments disclosed in the accompanying drawings, and it should be understood to include all equivalents or substitutes included in the spirit and scope of the invention.

Terms such as first or second may be used to describe various components, but the components should not be limited by the terms. The terms are only for the purpose of distinguishing one component from another component.

In this specification, it should be understood that term "include" or "have" indicates that a feature, a number, a step, an operation, a component, a part, or the combination thereof described in the specification is present, but does not exclude a possibility of presence or addition of one or more other features, numbers, steps, operations, components, parts or combinations thereof, in advance. When a component is said to be "connected" or "accessed" to another component, it may be directly connected to or accessed to that other component, but it is to be understood that other components may exist in between. On the other hand, when a component is said to be "directly connected" or "directly accessed" to another component, it should be understood that there is no other component in between.

Meanwhile, "a module" or "a unit, part or portion" for a component used in the specification performs at least one function or operation. And, the "module" or "unit, part or portion" may perform a function or operation by hardware, software, or a combination of hardware and software. In addition, a plurality of "modules" or a plurality of "units, parts or portions" except for modules" or "units, parts or portions" that should be performed in a specific hardware or is performed by at least one processor may be integrated into at least one module. Singular expressions used herein include plural expressions unless they have definitely opposite meanings in the context.

In addition, in the description of the present disclosure, when it is determined that specific description about the related known technique may unnecessarily obscure the gist of the present disclosure, a detailed description thereof is abbreviated or omitted.

Figure 2:
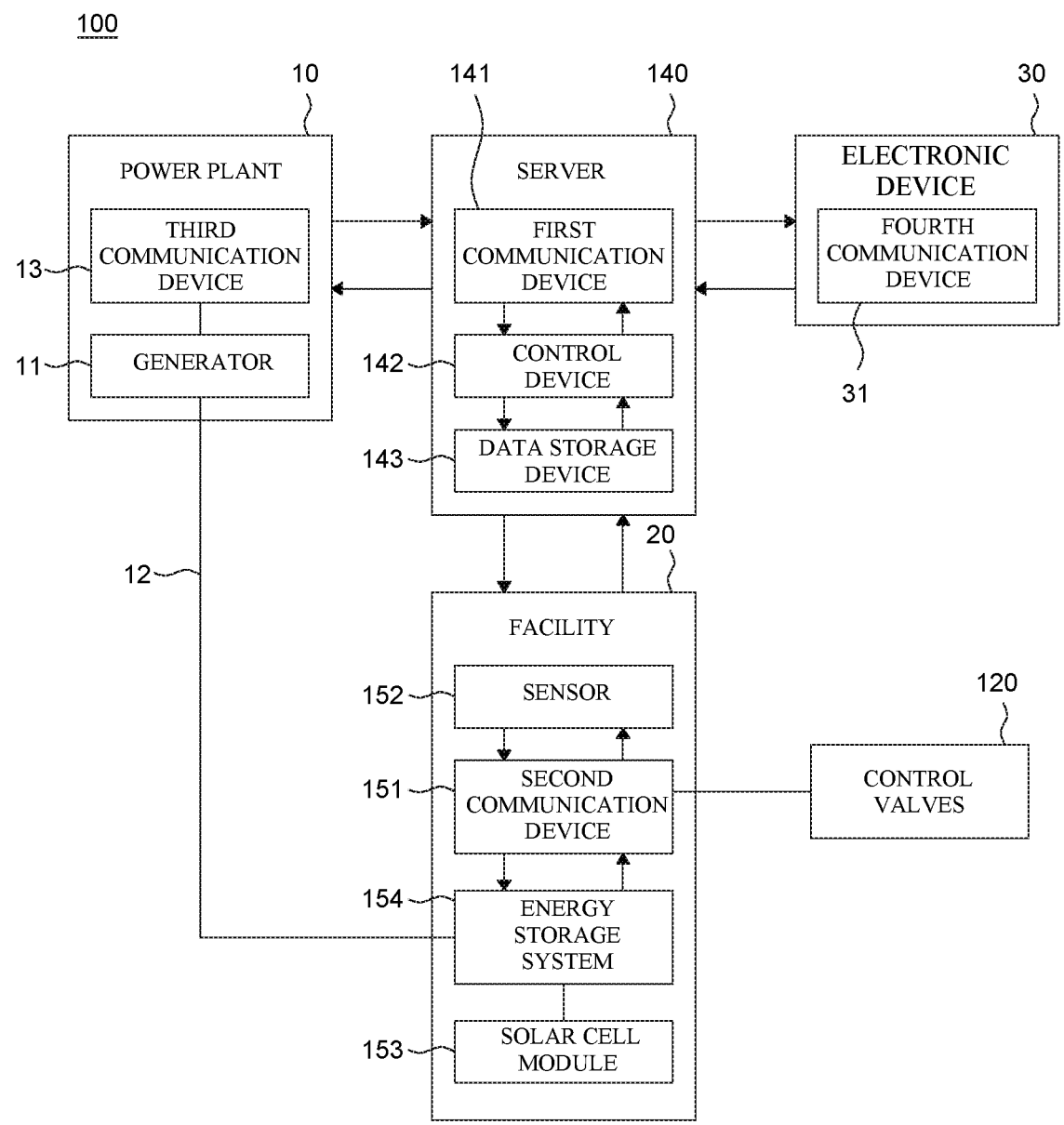
FIG. 2 is a block diagram schematically illustrating a configuration of the energy supply system using hot waste water according to an exemplary embodiment of the present disclosure.

FIG. 1 is a diagram schematically illustrating an energy supply system using hot waste water according to an exemplary embodiment of the present disclosure. FIG. 2 is a block diagram schematically illustrating a configuration of the energy supply system using hot waste water according to an exemplary embodiment of the present disclosure.

Referring to FIGS. 1 and 2, an energy supply system 100 using hot waste water according to an exemplary embodiment of the present disclosure (hereinafter, referred to as an 'energy supply system') includes a hot waste water pipe 110 that supplies hot waste water discharged from a power plant 10 to at least one facility 20.

The power plant 10 may include a generator 11 that generates electric power by using combustion heat of fuel such as coal or petroleum, and a third communication device 13 that transmits and receives electrical signals in a wired or wireless manner.

The third communication device 13 may include a wireless communication module such as a cellular communication module, a short-range wireless communication module, or a global navigation satellite system (GNSS) communication module, or a wired communication module such as a local area network (LAN) communication module or a power line communication module. The third communication device 13 may communicate with an external electronic device 30 via a short-range communication network, such as Bluetooth, wireless-fidelity (Wi-Fi) direct, or infrared data association (IrDA)) or a long-range communication network, such as a cellular network, the Internet, or a computer network (e.g., LAN or wide area network (WAN)) using a wireless communication module or a wired communication module.

The at least one facility 20 may include a plurality of first facilities 21 that receive hot waste water from the power plant 10 through the hot waste water pipe 110, and at least one second facility 22 and at least one third facility 23 that do not receive hot waste water.

The plurality of first facilities 21 may be farmhouse facilities for growing crops, flowering facilities for growing flowers, or livestock facilities for raising livestock. A heating facility using hot waste water may be disposed in the plurality of first facilities 21.

The at least one second facility 22 may be a low temperature storage warehouse that stores crops or flowers grown in the plurality of first facilities 21.

The at least one third facility 23 may be a house where a human or dog lives.

The hot waste water pipe 110 may include a first transfer pipe 111 through which hot waste water discharged from the power plant is transferred, a plurality of second transfer pipes which are branched from the first transfer pipe 111 and individually connected to the plurality of first facilities 21, and a recovery pipe 113 which transfers the hot waste water recovered from the plurality of first facilities 21 to the power plant.

In the power plant 10, the hot waste water recovered from the plurality of first facilities 21 through the recovery pipe 113 may be reused as cooling water.

The energy supply system 100 includes a plurality of control valves 120 respectively disposed on the plurality of second transfer pipes 112.

The control valve 120 may control a flow rate of hot waste water supplied from the power plant 10. The control valve 120 may control the flow rate of the hot waste water according to an electrical signal transmitted from the outside.

The energy supply system 100 includes a ground heat exchanger 130 for supplying geothermal energy.

The ground heat exchanger 130 may be buried under the ground and connected to the at least one facility 20. A heating medium flows within the ground heat exchanger 130.

The ground heat exchanger 130 is connected to the plurality of first facilities 21 and the at least one third facility 23. Since the heating medium of the ground heat exchanger 130 supplies, together with hot waste water, thermal energy to at least one facility 20, heating costs of the plurality of first facilities 21 are reduced.

Although not shown in FIG. 1, when the ground heat exchanger 130 supplies energy required for cooling, the ground heat exchanger 130 may be connected to the at least one second facility 22.

The ground heat exchanger 130 will be described in detail with reference to the accompanying drawings.

The energy supply system 100 includes a server 140.

The server 140 includes a first communication device 141, a control device 142, and a data storage device 143.

The first communication device 141 may transmit and receive electrical signals to and from the third communication device 13 of the power plant 10 in a wired or wireless manner.

The first communication device 141 may include a wireless communication module such as a cellular communication module, a short-range wireless communication module, or a global navigation satellite system (GNSS) communication module, or a wired communication module such as a local area network (LAN) communication module or a power line communication module. The first communication device 141 may communicate with the external electronic device 30 via a short-range communication network, such as Bluetooth, wireless-fidelity (Wi-Fi) direct, or infrared data association (IrDA)) or a long-range communication network, such as a cellular network, the Internet, or a computer network (e.g., LAN or wide area network (WAN)) using a wireless communication module or a wired communication module.

The control device 142 controls the electrical signal transmitted or received through the first communication device 141. The control device 142 may control a device or configuration connected to the control device 142 by running software such as a program, and processes various types of data and operations.

The data storage device 143 is electrically connected to the control device 142 and stores the electrical signal controlled by the control device 142 as data. The control device 142 receives data stored in the data storage device 143 as an electrical signal and processes the data.

The energy supply system 100 includes a second communication device 151 that is disposed in the at least one facility 20 and transmits and receives an electrical signal to and from the first communication device 141 of the server 140 in a wired or wireless manner.

The second communication device 151 may include a wireless communication module such as a cellular communication module, a short-range wireless communication module, or a global navigation satellite system (GNSS) communication module, or a wired communication module such as a local area network (LAN) communication module or a power line communication module. The second communication device 151 may communicate with the external electronic device 30 via a short-range communication network, such as Bluetooth, wireless-fidelity (Wi-Fi) direct, or infrared data association (IrDA)) or a long-range communication network, such as a cellular network, the Internet, or a computer network (e.g., LAN or wide area network (WAN)) using a wireless communication module or a wired communication module.

The second communication device 151 is electrically connected to the control valve 120.

The control device 142 is electrically connected to the control valve 120 through the first communication device 141 and the second communication device 151. The control device 142 may individually control the plurality of control valves 120 according to environmental conditions inside the plurality of first facilities 21 to thereby individually control a flow rate of hot waste water which is supplied to the plurality of first facilities 21.

Since the control device 142 of the server 140 individually controls the flow rate of the hot waste water supplied to the plurality of first facilities 21, it efficiently manages energy supplied to the plurality of first facilities 21.

The energy supply system 100 includes a sensor 152 disposed in the at least one facility 20.

The sensor 152 senses information on an environmental state and converts it into an electrical signal. The information on the environmental state may be a PH value, moisture content, temperature and the like in the at least one facility 20, and may be various types of information for growing crops or flowers or raising livestock.

The second communication device 151 transmits the electrical signal according to the sensor 152 to the first communication device 141 of the server 140. The electrical signal according to the sensor 152 is transmitted to the control device 142 of the server 140.

The control device 142 transmits a control signal for controlling the flow rate of the hot waste water to the first communication device 141 based on the electric signal according to the sensor 152. The first communication device 141 transmits the control signal to the second communication device 151. The second communication device 151 transmits the control signal to the control valve 120.

The control valve 120 that has received the control signal controls the flow rate of hot waste water supplied to the at least one facility 20.

Therefore, the energy supply system 100 controls the flow rate of the hot waste water supplied to the at least one facility 20 based on information on the environmental state inside the at least one facility 20, costs of electric energy for heating and cooling of the at least one facility 20 are reduced.

The energy supply system 100 further includes at least one solar cell module 153 and an energy storage system 154.

The solar cell module 153 converts sunlight into electrical energy. The solar cell module 153 may be provided in a structure in which modules composed of a plurality of cells are arranged in a predetermined shape. The solar cell module 153 is disposed in the at least one facility 20.

The energy storage system (ESS) is a device that stores electrical energy (e.g., electric power). The energy storage system 154 may include a battery that stores electric energy, a power conditioning system (PCS) that converts current, an energy management system (EMS) that controls the battery and PCS, and the like.

The energy storage system 154 is disposed in the at least one facility 20. The energy storage system 154 is electrically connected to the solar cell module 153 to store electrical energy generated through the solar cell module 153. The energy storage system 154 may supply stored electric energy to an electronic device disposed in the at least one facility 20 as necessary.

The energy storage system 154 may be supplied with electric energy from the generator 11 of the power plant 10 through a power line 12.

The server 140 individually controls thermal energy, geothermal energy, and electric energy that are supplied to at least one facility according to the environmental state of the at least one facility 20, so that the supply of energy required for the at least one facility 20 is managed by the server 140 in an integrated manner.

The energy storage system 154 is electrically connected to the second communication device 151. The energy storage system 154 transmits a value of the amount of electric energy stored in the energy storage system 154 to the second communication device 151. The second communication device 151 transmits the value of the amount of electric energy stored in the energy storage system 154 to the first communication device 141 of the server 140. The first communication device 141 transmits the value of the amount of electric energy stored in the energy storage system 154 to the control device 142.

The control device 142 may compare a value of a predetermined amount of electrical energy with the value of the amount of electric energy stored in the energy storage system 154. Here, the value of the predetermined amount of electric energy may be a value of the amount of electric energy which is required for a predetermined time in the at least one facility 20. The control device 142 may transmit the value of the predetermined amount of electric energy to the data storage device 143. The data storage device 143 stores the value of the predetermined amount of electric energy as an electric signal.

When the value of the amount of electrical energy stored in the energy storage system 154 is less than the value of the predetermined amount of electrical energy, the first communication device 141 of the server 140 transmits an electrical signal for supplying electrical energy from the power plant 10 to the energy storage system 154, to the third communication device 13 of the power plant 10.

The power plant 10 may control the amount of electrical energy generated by the generator 11 of the power plant 10 based on the electrical signal for supplying electrical energy from the power plant 10 to the energy storage system 154. Accordingly, since the power plant 10 can reduce unnecessarily produced electric energy, an electric energy cost of the power plant 10 is reduced.

The energy supply system 100 further includes the electronic device 30.

The electronic device 30 may be a variety of electronic devices having a communication function and an image output function, such as a mobile communication terminal such as a smart phone, a tablet PC, a video/audio device, a desktop/laptop computer, a vehicle navigation system, and a home appliance.

The electronic device 30 includes a fourth communication device 31.

The fourth communication device 31 may include a wireless communication module such as a cellular communication module, a short-range wireless communication module, or a global navigation satellite system (GNSS) communication module, or a wired communication module such as a local area network (LAN) communication module or a power line communication module. The fourth communication device 31 may communicate with another electronic device 30 via a short-range communication network, such as Bluetooth, wireless-fidelity (Wi-Fi) direct, or infrared data association (IrDA)) or a long-range communication network, such as a cellular network, the Internet, or a computer network (e.g., LAN or wide area network (WAN)) using a wireless communication module or a wired communication module.

The fourth communication device 31 may transmit or receive an electrical signal to or from the first communication device 141 of the server 140 in a wired or wireless manner. For example, the fourth communication device 31 may receive information on the at least one facility 20 (e.g., information on an environmental state, a value of the amount of electric energy used, and a predicted value of the amount of electric energy which is expected to be used) through the server 140, so that the information on the at least one facility 20 may be output to a display of the electronic device 30.

Referring to FIGS. 3 to 13, the ground heat exchanger 130 will be described.

Figure 3:
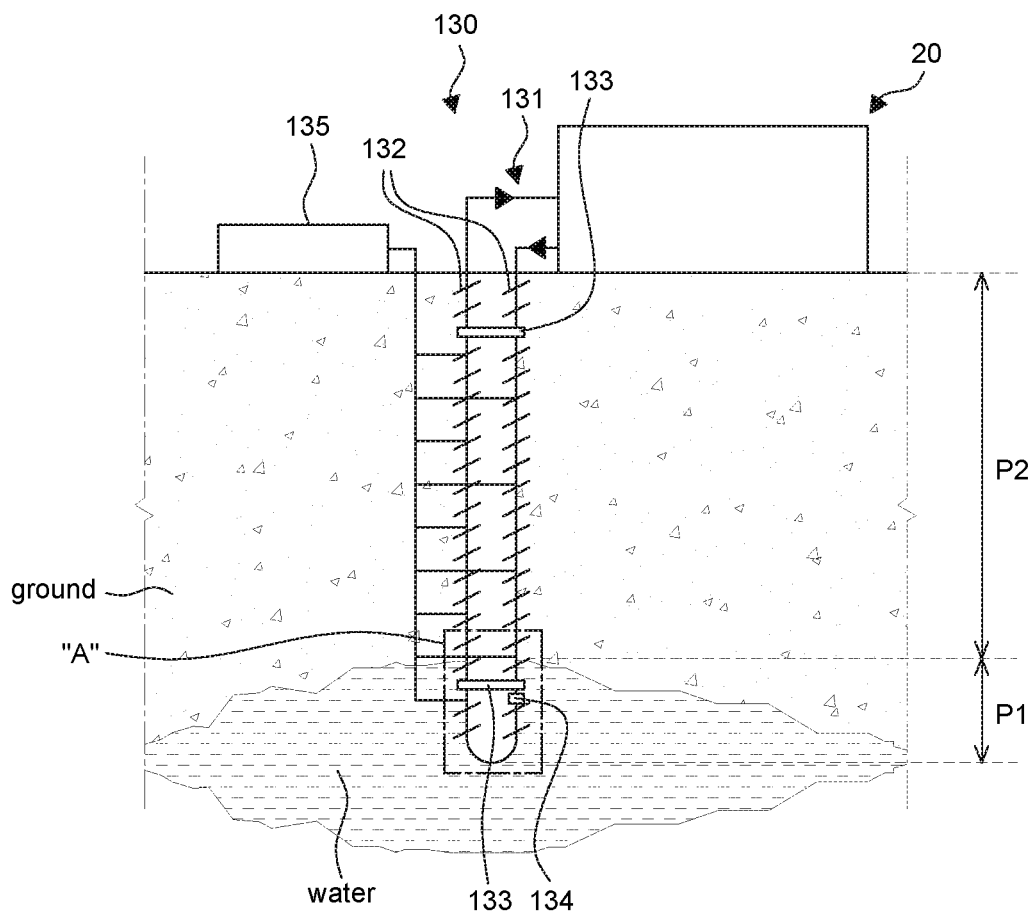
FIG. 3 is a view schematically illustrating a ground heat exchanger of FIG. 1.

FIG. 3 is a view schematically illustrating the ground heat exchanger of FIG. 1.

Referring to FIG. 3, the ground heat exchanger 130 is connected to the at least one facility 20. The ground heat exchanger 130 is buried under the ground and circulates the heating medium to perform heat exchange with the geothermal heat. The at least one facility 20 may include, a cooling and heating system (not shown) that performs heat exchange between the heat-exchanged heating medium which is transferred from the ground heat exchanger 130 and a second heating medium which is required for cooling and heating to thereby supply a heat source to a cooling and heating device.

Here, although not shown in the drawings, the cooling and heating system may include a plurality of functional units. More particularly, the cooling and heating system may include a cooling and heating unit which is configured to perform indoor heating or cooling, a heat pump unit which supplies the second heating medium flowing that has been heat-exchanged with the heating medium supplied through the ground heat exchanger 130 to the cooling and heating unit, and a transfer line which connects the ground heat exchanger 130, the heating and cooling unit, and the heat pump unit.

The ground heat exchanger 130 includes a heat exchange pipe 131 which is buried under the ground and connected to the at least one facility 20, and a plurality of heat exchange fins 132 which are coupled to an outer circumferential surface of the heat exchange pipe 131.

The heat exchange pipe 131 may be formed in a "U" shaped structure in such a manner that the heating medium introduced from the at least one facility 20 is heat-exchanged and then, transferred to the at least one facility 20, again.

In addition, the heat exchange pipe 131 may be formed in a shape in which a plurality of parts are combined with each other.

Figure 4:
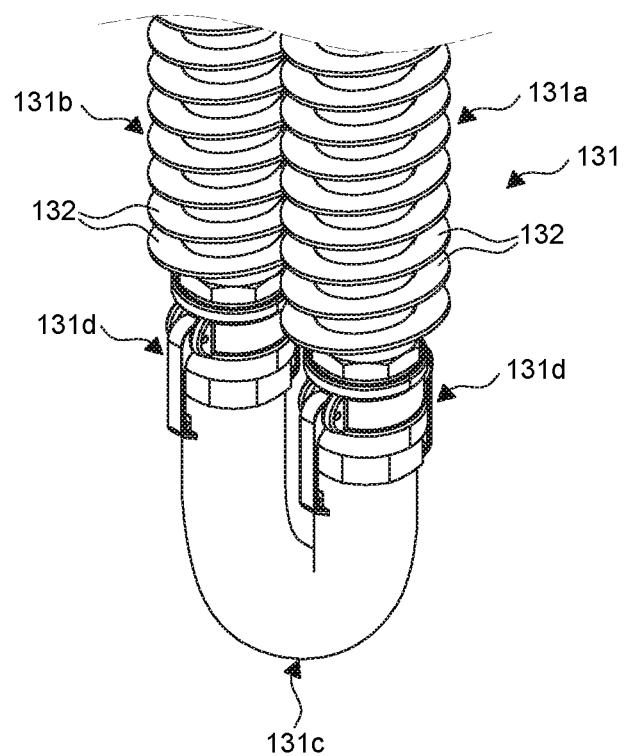
FIG. 4 is a perspective view illustrating a portion of the ground heat exchanger of FIG. 3.
Figure 5:
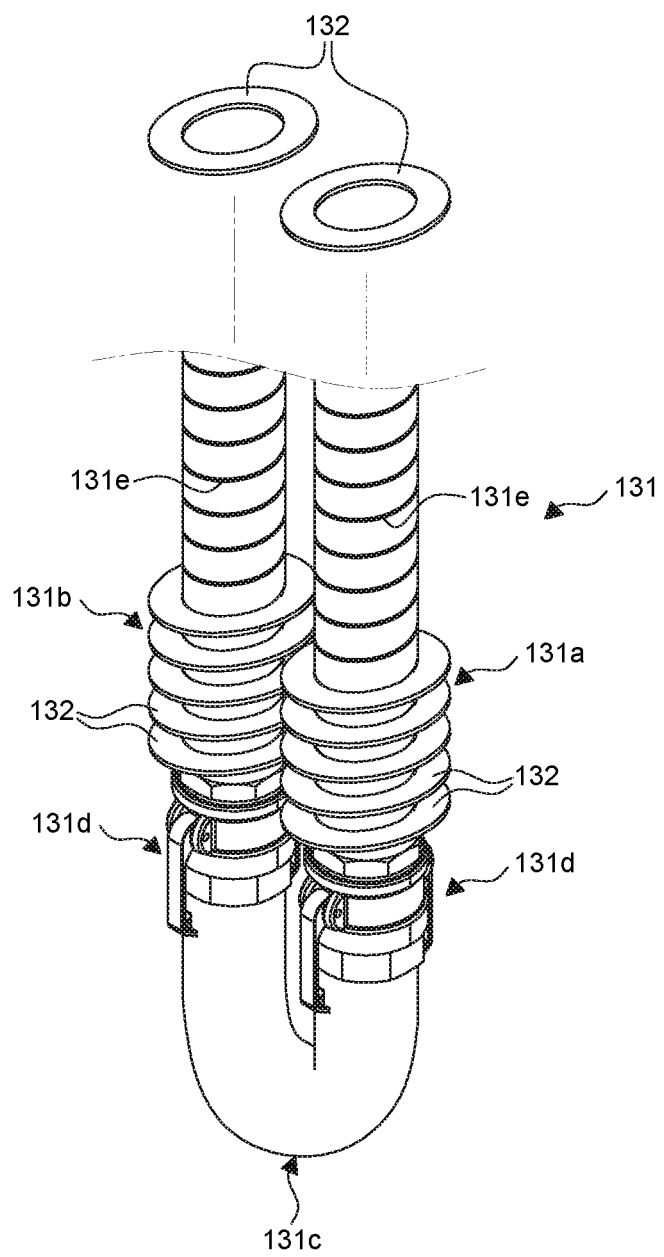
FIG. 5 is a perspective view illustrating a state in which a heat exchange pipe and a heat exchange fin are separated in the ground heat exchanger of FIG. 1.

FIG. 4 is a perspective view illustrating a portion of the ground heat exchanger of FIG. 3. FIG. 5 is a perspective view illustrating a state in which the heat exchange pipe and the heat exchange fin are separated in the ground heat exchanger of FIG. 1.

Referring to FIGS. 4 and 5, the heat exchange pipe 131 may include a supply pipe 131a which guides a heating medium introduced from the outside to a lower side of the ground, a return pipe 131b which guides the heating medium that has passed through the supply pipe 131a to an upper side of the ground, and a connection pipe 131c which connects the supply pipe 131a and the return pipe 131b and changes a direction of the heating medium that has passed through the supply pipe 131a to thereby guide the heating medium toward the return pipe 131b. The heating medium may be heat-exchanged while flowing in the supply pipe 131a, the return pipe 131b, and the connection pipe 131c.

The supply pipe 131a and the return pipe 131b may be respectively connected to the connection pipe 131c through coupling parts 131d. For example, the coupling parts 131d may be configured to have a male and female structure capable of being fastened to each other, and may also be configured to have various fastening structures in addition to the male and female structure.

A length and diameter of each of the supply pipe 131a, the return pipe 131b, and the connection pipe 131c may be determined according to a depth of a buried area or capacity of the cooling and heating system.

The plurality of heat exchange fins 132 may be coupled to an outer circumferential surface of the supply pipe 131a and an outer circumferential surface of the return pipe 131b. Accordingly, heat exchange may be performed during an entire process of circulating the heating medium, thereby maximizing heat exchange efficiency of the heating medium.

Referring to FIGS. 3 and 5, the plurality of heat exchange fins 132 are disposed to be spaced apart from each other along a direction in which the heat exchange pipe 131 extends, and transfer heat from the ground to the heating medium which are moving, or transfer heat from the heating medium to the ground and allow the heating medium to heat-exchange.

The plurality of heat exchange fins 132 may be formed in a ring shape capable of being coupled to the outer circumferential surface of the heat exchange pipe 131.

Specifically, the plurality of heat exchange fins 132 includes a through-hole corresponding to the outer circumferential surface of the heat exchange pipe 131 in an inner portion thereof. And, the plurality of heat exchange fins 132 may be formed in a helical ring shape or a circular disk shape in which they have a thickness smaller than that of the heat exchange pipe 131 so that heat exchange can be promptly performed between the heating medium and the ground. However, the plurality of heat exchange fins 132 are not necessarily limited thereto, and may be changed and applied in various forms in consideration of ground environments of a buried area.

In addition, the plurality of heat exchange fins 132 may be detachable from the heat exchange pipe 131.

Figure 8:
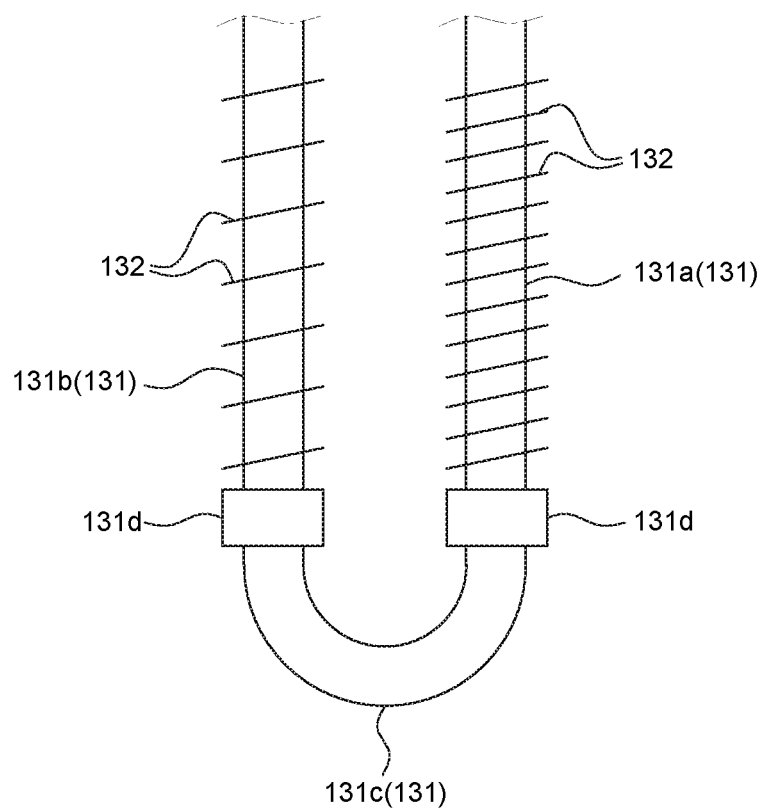
FIG. 8 is a view schematically illustrating a state in which a larger number of heat exchange fins are coupled to a supply pipe than a return pipe in the ground heat exchanger of FIG. 1.
Figure 11:
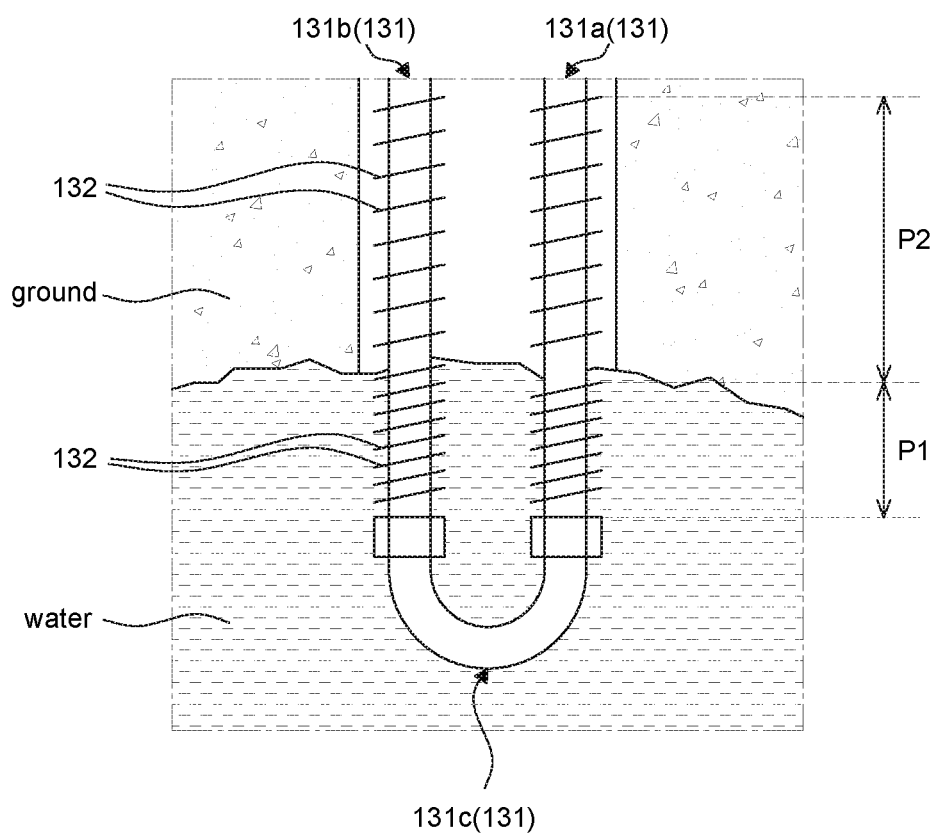
FIG. 11 is an enlarged view of portion "A" of FIG. 3.

FIG. 8 is a view schematically illustrating a state in which a larger number of heat exchange fins are coupled to a supply pipe than a return pipe in the ground heat exchanger of FIG. 1, and FIG. 11 is an enlarged view of portion "A" of FIG. 3.

Referring to FIGS. 8 and 11, since the plurality of heat exchange fins 132 may be individually detachably coupled to the heat exchange pipe 131, the plurality of heat exchange fins 132 may be arranged along a length direction of the heat exchange pipe 131 by varying density thereof, or positions of the arranged plurality of heat exchange fins 132 may be adjusted. Here, the density means the number of heat exchange fins 132 arranged per unit length.

Accordingly, heat exchange efficiency of the heating medium can be maximized by more intensively arranging the plurality of heat exchange fins 132 in a specific portion of the heat exchange pipe 131 in consideration of ground environments of the buried area.

As an example, referring to FIG. 8, a larger number of heat exchange fins 132 may be disposed in the supply pipe 131a than the return pipe 131b. That is, the density of the heat exchange fins 132 disposed on the supply pipe 131a may be greater than the density of the heat exchange fins 132 disposed in the return pipe 131b.

To maximize the heat exchange efficiency of the heating medium in a process of moving the heating medium to the lower side of the ground, which is maintained at a relatively constant temperature, compared to the upper side of the ground, which is greatly affected by environments on the ground, a larger number of the heat exchange fins 132 may be arranged in the supply pipe 131a than in the return pipe 131b.

To maximize heat exchange efficiency, the supply pipe 131a may be formed of a metallic material, and the return pipe 131b and the connection pipe 131c may be formed of the same metallic material as the supply pipe 131a, or may be formed of a non-metallic material. For example, the metallic material may include a stainless-steel material or a SUS (Stainless Use Steel) material, and the non-metallic material may include a polyethylene (PE) material. However, the materials of the supply pipe 131a, the return pipe 131b, and the connection pipe 131c are not necessarily limited to the stainless-steel material, the SUS material, and the polyethylene (PE) material which are described above, and may be changed into various materials.

As another example, referring to FIG. 11, when groundwater exists under the ground of the buried area, a density of the heat exchange fins 132 disposed in a first portion P1 of the heat exchange pipe 131 which is exposed to groundwater is greater than a density of the heat exchange fins 132 disposed in a second portion P2 of the heat exchange pipe 131.

When groundwater exists under the ground of the buried area, the first portion P1 of the heat exchange pipe 131 buried under the ground is disposed to be exposed to the groundwater, and the second portion P2 of the heat exchange pipe 131 may be disposed to be exposed to the ground.

Since heat transfer through groundwater is more efficient than heat transfer through the air, an increase in heat transfer area of the first portion P1 of the heat exchange pipe 131 exposed to groundwater is more efficient than an increase in heat transfer area of the second portion P2 of the heat exchange pipe 131 which is exposed to the air.

Therefore, to maximize heat exchange efficiency of the first portion P1 of the heat exchange pipe 131 exposed to groundwater, a greater number of the heat exchange fins 132 may be configured to be disposed in the first portion P1 of the heat exchange pipe 131 in a concentrated manner, than in the second portion P2 of the heat exchange pipe 131. That is, since the density of the heat exchange fins 132 disposed in the first portion P1 is configured to be greater than the density of the heat exchange fins 132 disposed in the second portion P2, the heat exchange efficiency is more effectively improved.

To maximize heat exchange efficiency, the first portion P1 of the heat exchange pipe 131 may be formed of a metallic material, and the second portion P2 of the heat exchange pipe 131 may be formed of the same metallic material as the first portion P1 of the heat exchange pipe 131 or may be formed of a non-metallic material.

Referring to FIG. 5, the plurality of heat exchange fins 132 may move in the direction in which the heat exchange pipe 131 extends along the outer circumferential surface of the heat exchange pipe 131.

The outer circumferential surface of the heat exchange pipe 131 may be provided with guide grooves 131e having a helical shape, from one end thereof to the other end thereof.

The plurality of heat exchange fins 132 formed in a shape of a disk-like ring or a helical ring may be rotated along the guide grooves 131e while being coupled to the guide grooves 131e and move in the direction in which the heat exchange pipe 131 extends.

Therefore, even in a state in which the plurality of heat exchange fins 132 are coupled to the outer circumferential surface of the heat exchange pipe 131, the positions of the heat exchange fins 132 can be adjusted, and a spaced distance between the heat exchange fins 132 can be adjusted.

The heat exchange fins 132 may include a louver structure.

Figure 6:
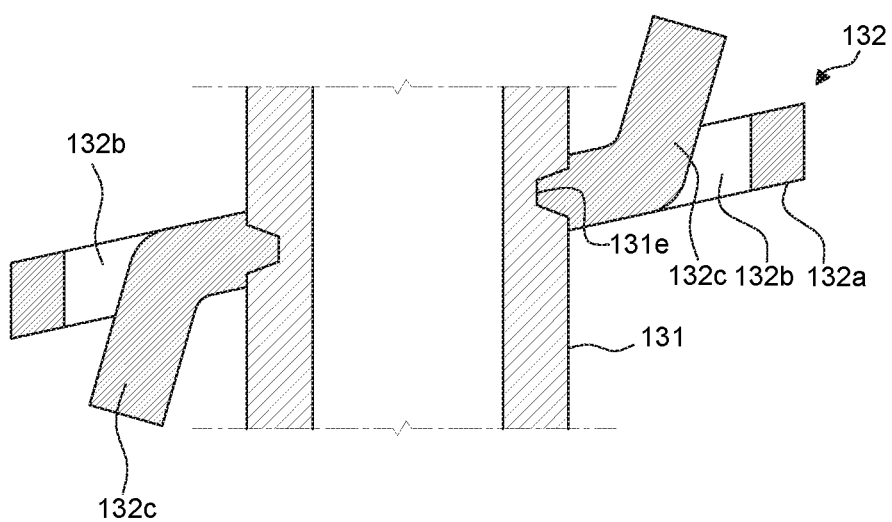
FIGS. 6 and 7 are views each schematically illustrating a cross-sectional structure of the heat exchange fin coupled to the heat exchange pipe in the ground heat exchanger of FIG. 5.
Figure 7:
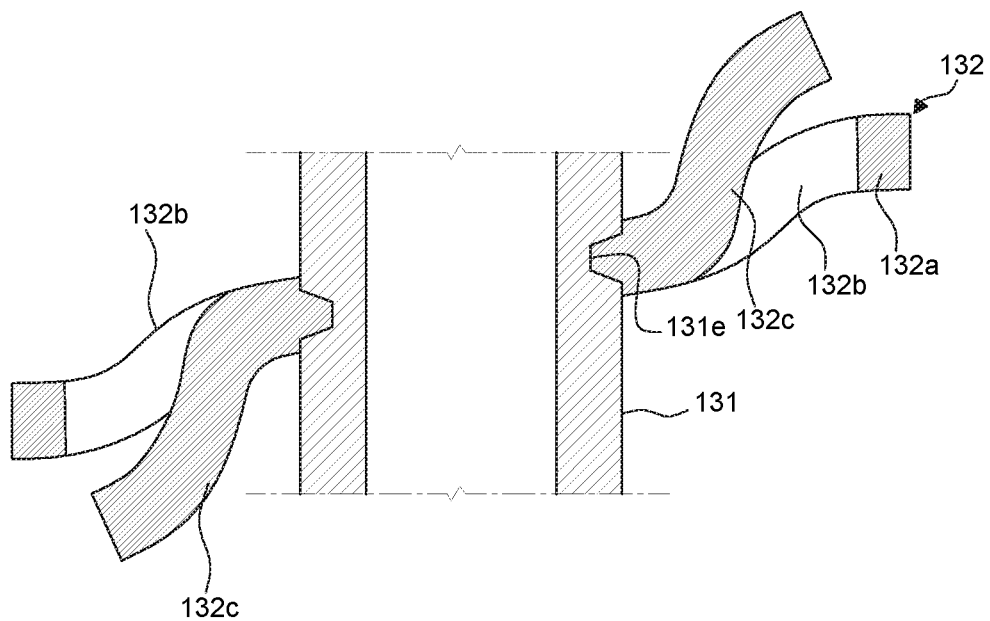

FIGS. 6 and 7 are views each schematically illustrating a cross-sectional structure of the heat exchange fin coupled to the heat exchange pipe in the ground heat exchanger of FIG. 5

Referring to FIG. 6, the heat exchange fins 132 may include a ring-shaped fin body 132a, a plurality of through-holes 132b formed by cutting at least one or more portions of the fin body 132a, and guide members 132c for guiding the air passing through the plurality of through-holes 132b.

The plurality of through-holes 132b are disposed to be spaced apart from each other along a circumference of the fin body 132a, and guide the air under the ground toward the guide members 132c to thereby allow for smooth heat transfer between the guide members 132c and the air.

The guide members 132c may form a predetermined angle with an outer surface of the pin body 132a and may be disposed in plural number along the circumference of the pin body 132a to correspond to the plurality of through-holes 132b.

Accordingly, the air in contact with the outer surface of the fin body 132a contacts an inner surface of the fin body 132a while being introduced into the plurality of through-holes 132b, and at the same time, contacts the guide members 132c to thereby perform heat exchange.

By the plurality of through-holes 132b and the plurality of guide members 132c formed in the heat exchange fins 132, contact areas of the heat exchange fins 132 in contact with the air under the ground increase, whereby heat exchange efficiency is improved.

In addition, through the plurality of through-holes 132b and the plurality of guide members 132c, it may be possible to prevent moisture contained in the ground air from being implanted on surfaces of the heat exchange fins 132, or it may be possible to delay a progress degree of implantation.

The plurality of heat exchange fins 132 may be provided with at least one curved surface.

Referring to FIG. 7, surfaces of the ring-shaped pin body 132a and the plurality of guide members 132c may be provided with curved surfaces for guiding air flow.

Upper and lower surfaces of the pin body 132a, and upper and lower surfaces of each of the guide members 132c may be formed of round curved surfaces that bend downward or upward with a predetermined curvature.

Since the air under the ground (hereinafter, referred to as 'the ground air') in contact with the fin body 132a and the guide members 132c is guided to an inner surface of the fin body 132a and stays within the fin body 132a for a long time, the heat exchange efficiency of the heating medium can be improved. In addition, a vortex or turbulence is generated in a process in which the ground air moves along the curved surfaces formed in the guide members 132c, so that the heat exchange efficiency of the heating medium may be improved.

The ground heat exchanger 130 may further include a clamping member 133.

Figure 9:
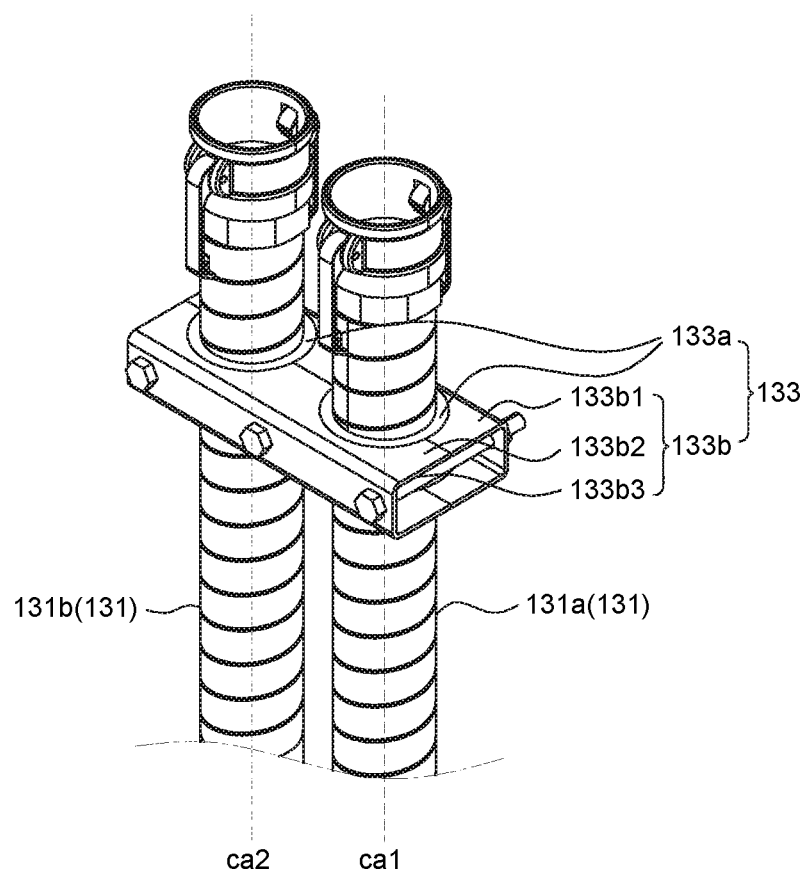
FIG. 9 is a perspective view illustrating a state in which a clamping unit is coupled to the supply pipe and the return pipe in the ground heat exchanger of FIG. 1.
Figure 10:
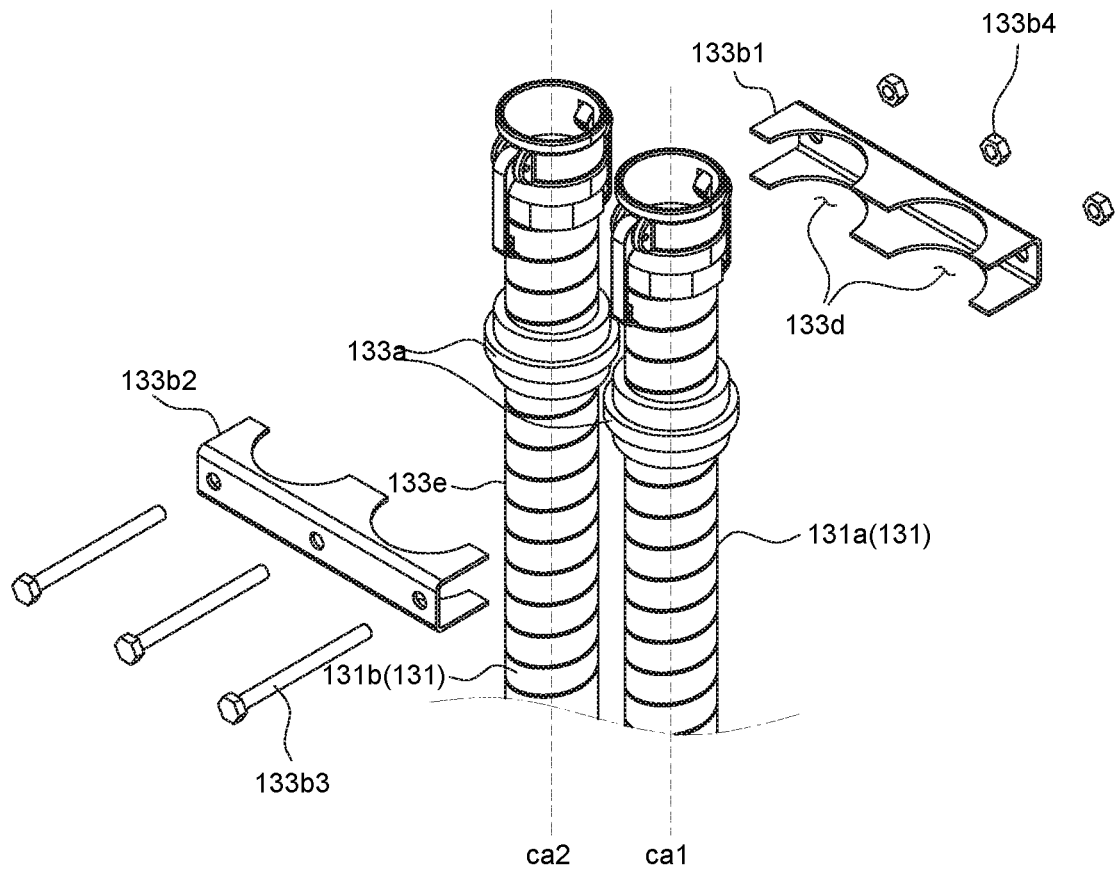
FIG. 10 is a perspective view illustrating an exploded state of the clamping unit of FIG. 8.

FIG. 9 is a perspective view illustrating a state in which a clamping unit is coupled to the supply pipe and the return pipe in the ground heat exchanger of FIG. 1. FIG. 10 is a perspective view illustrating an exploded state of the clamping unit of FIG. 8.

Referring to FIGS. 3 and 9, at least one clamping member 133 may be provided and coupled to the supply pipe 131a and the return pipe 131b.

The clamping member 133 coupled to the supply pipe 131a and the return pipe 131b separates the supply pipe 131a and the return pipe 131b from each other, and the supply pipe 131a and the return pipe 131b may be disposed in parallel to each other in a state in which the clamping member 133 is coupled to the supply pipe 131a and the return pipe 131b.

The clamping member 133 may be coupled to upper ends or lower ends of the supply pipe 131a and the return pipe 131b so as not to overlap with the plurality of heat exchange fins 132 installed in the supply pipe 131a and the return pipe 131b.

Referring to FIGS. 9 and 10, the clamping member 133 may include a plurality of elastic units 133a and a clamping unit 133b.

The plurality of elastic units 133a are respectively coupled to an outer circumferential surface of the supply pipe 131a and an outer circumferential surface of the return pipe 131b, and may be formed of an elastic material such as rubber or silicone so as to absorb and disperse vibration impacts transmitted from the pipe.

The clamping unit 133b may be coupled to outer surfaces of the plurality of elastic units 133a to separate the supply pipe 131a and the return pipe 131b from each other, and may align the supply pipe 131a and the return pipe 131b such that a central axis ca1 of the supply pipe 131a and a central axes ca2 of the return pipe 131b are parallel to each other.

The clamping unit 133b may include a first support member 133b1 which includes receiving grooves 133d corresponding to outer surfaces of one sides of the elastic units 133a so as to receive the one sides of the elastic units 133a coupled to the supply pipe 131a and the return pipe 131b and which supports the one sides of the elastic units 133a, a second support member 133b2 which is disposed to be opposed to the first support member 133b1, which includes receiving grooves 133 133e corresponding to outer surfaces of the other sides of the elastic units 133a, and which supports the other sides of the elastic units 133a, and fastening members 133b3 which press the first support member 133b1 and the second support member 133b2 to thereby couple the first support member 133b1 and the second support member 133b2 to each other.

The supply pipe 131a and the return pipe 131b are maintained in a state in which they are in parallel and spaced apart from each other through the clamping member 133 coupled to outsides thereof, and even when they are connected to at least one facility or the connecting pipe 131c is coupled thereto, it is possible to prevent a phenomenon in which the axis of the supply pipe 131a or the return pipe 131b is out of its position, or the supply pipe 131a or the return pipe 131b is separated from a predetermined position thereof.

The ground heat exchanger 130 may further include a water quality measurement sensor 134.

Referring to FIG. 3, the water quality measurement sensor 134 may be installed in the first portion P1 of the heat exchange pipe 131 which is exposed to groundwater and measure water quality of the groundwater.

The water quality measurement sensor 134 may be installed in the first portion P1 of the heat exchange pipe 131 exposed to groundwater, measure groundwater temperature, turbidity, electrical conductivity, residual chlorine, pH and the like, and transmit measurement information to the control device 142 (refer to FIG. 2) provided in the server 140 (refer to FIG. 1).

The ground heat exchanger 130 may further include a sacrificial anode 135.

Referring to FIG. 3, the sacrificial anode 135 is formed of a metallic material having a lower potential than that of the heat exchange pipe 131 formed of a metallic material such as SUS, and may be electrically connected to the heat exchange pipe 131 and may be corroded in place of the heat exchange pipe 131 by lapse of time. The sacrificial anode 135 may include magnesium (Mg), aluminum (Al), zinc (Zn), or the like.

When the heat exchange pipe 131 formed of a metallic material such as SUS and the sacrificial anode 135 formed of a metallic material having a lower potential than that of the heat exchange pipe 131 are connected by a conductor, a current flows toward the sacrificial anode 135 through the connected conductor due to a potential difference between the heat exchange pipe 131 and the sacrificial anode 135, and electrons exiting the sacrificial anode 135 are absorbed by the heat exchange pipe 131. Accordingly, the sacrificial anode 135 may be corroded in place of the heat exchange pipe 131, and thus, the heat exchange pipe 131 may be prevented from being corroded due to the sacrificial anode 135.

Hereinafter, a ground heat exchanger 130a according to another exemplary embodiment of the present disclosure will be described.

For reference, for respective components for describing the ground heat exchanger 130a according to another exemplary embodiment of the present disclosure, the same reference numerals as those used in describing the ground heat exchanger 130 will be used for convenience of description. The same or redundant descriptions will be omitted.

Figure 12:
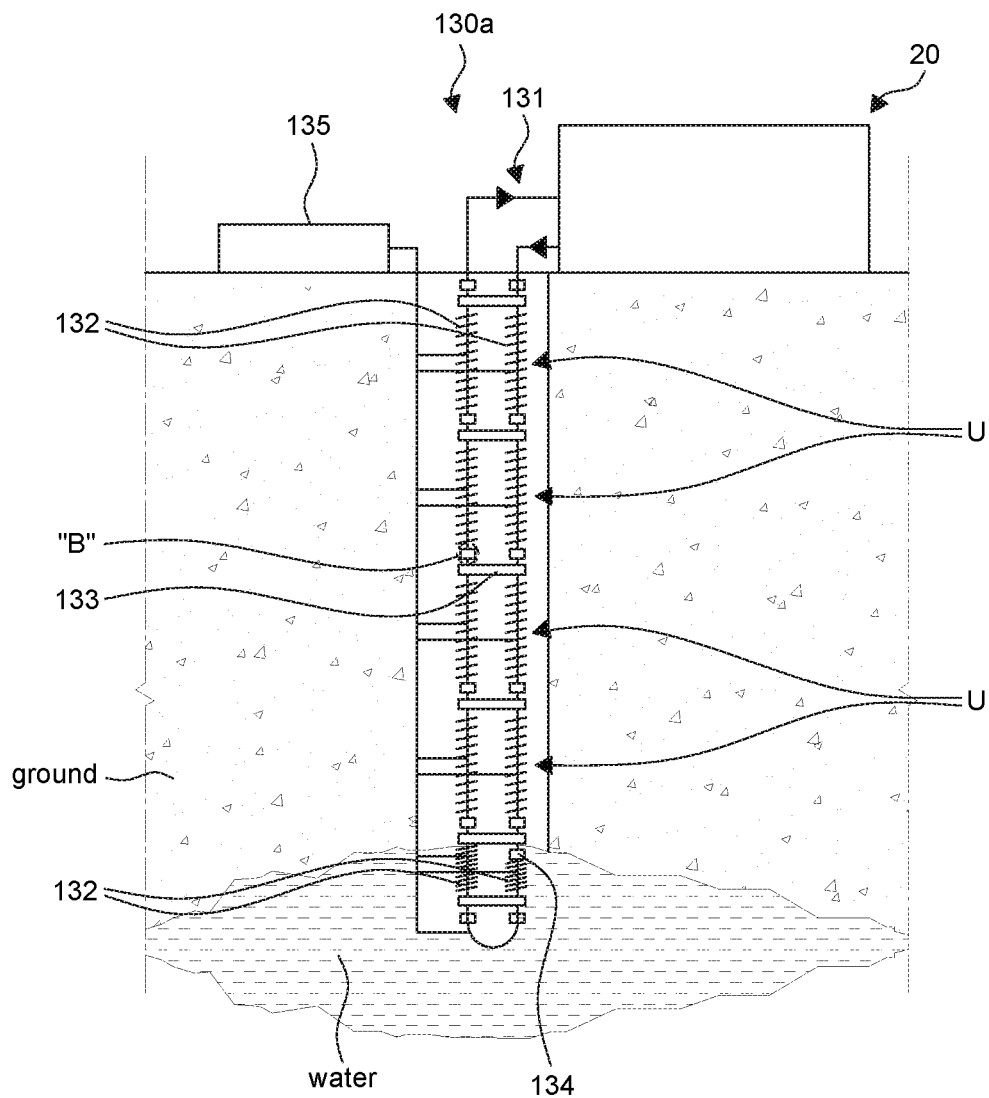
FIG. 12 is a view schematically illustrating a modified embodiment of the ground heat exchanger.
Figure 13:
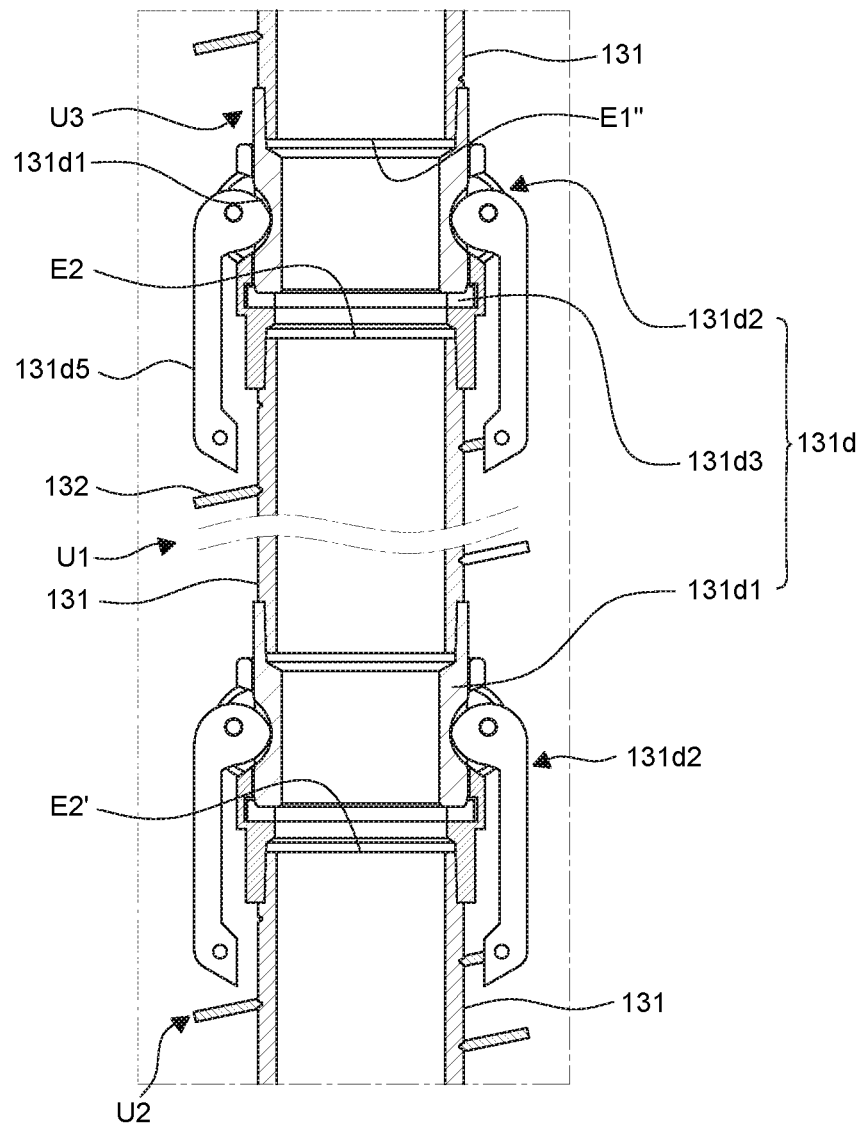
FIG. 13 is a view schematically illustrating a cross-sectional structure of portion "B" of FIG. 12.

FIG. 12 is a view schematically illustrating a modified embodiment of the ground heat exchanger, and FIG. 13 is a view schematically illustrating a cross-sectional structure of portion "B" of FIG. 12.

Referring to FIG. 12, the ground heat exchanger 130a (hereinafter, referred to as 'a ground heat exchanger 130a') according to another exemplary embodiment of the present disclosure includes a plurality of heat exchange units U1, U2, U3, U4, and U5 that can be connected to each other in an axial direction.

The plurality of heat exchange units U1, U2, U3, U4, and U5 may be selectively extended or reduced by being connected to each other according to environments of a buried area or energy use capacity of the at least one facility 20. In FIG. 12, it is shown that the ground heat exchanger 130a includes five heat exchange units U1, U2, U3, U4, and U5, but the ground heat exchanger 130a may include 4 or less or 6 or more heat exchange units.

The first heat exchange unit U1 includes the heat exchange pipe 131 which has the coupling parts 131d capable of being coupled to the second exchange unit U2 and the third exchange unit U3 at one end and the other end thereof, and the plurality of heat exchange fins 132 which are disposed to be spaced apart from each other along the direction in which the heat exchange pipe 131 extends.

The heat exchange pipe 131 may be formed in a "U" shaped structure in such a manner that the heating medium introduced from the at least one facility 20 is heat-exchanged and then, transferred to the at least one facility 20, again. The heat exchange pipe 131 may be formed in a shape in which a plurality of parts are combined with each other.

Referring to FIG. 13, the coupling part 131d may include a plug part 131d1 and a socket part 131d2.

The plug part 131d1 is provided at one end El of the heat exchange pipe 131 of the first heat exchange unit U1, and may be coupled to the socket part 131d2 provided at the other end E2' of the heat exchange pipe 131 of the second heat exchange unit U2.

The socket part 131d2 is provided at the other end E2 of the heat exchange pipe 131 of the first heat exchange unit U1, and may be coupled to the plug part 131d1 provided at one end E1" of the heat exchange pipe 131 of the third heat exchange unit U3.

The plug part 131d1 and the socket part 131d2 may be formed in a tube shape to communicate with the heat exchange pipe 131.

The plug part 131d1 and the socket part 131d2 may have an unevenness structure corresponding to each other. When the plug part 131d1 and the socket part 131d2 are coupled, the plug part 131d1 is inserted into the socket part 131d2, and the socket part 131d2 may press an outer surface of the plug part 131d1 which is inserted therein to thereby fix it thereto.

A groove portion 131d4 having an arc shape is provided in an outer circumferential surface of the plug part 131d1, and the socket part 131d2 may include a rotational arm 131d5 for fixing the plug part 131d1 by pressing the groove portion 131d4 after the plug part 131d1 is inserted into the socket part 131d2. A sealing member may be further provided in an inside of the socket part 131d2, the sealing member being disposed at an end of the plug part 131d1 coupled to the socket part 131d2 to seal between the plug part 131d1 and the socket part 131d2.

The plug part 131d1 and the socket part 131d2 are preferably formed of at least one of aluminum, SUS, brass, and polypropylene (PP), but are not necessarily limited thereto and can be changed into various materials to thereby applied.

Referring to FIG. 12, the plurality of heat exchange fins 132 are disposed to be spaced apart from each other along the direction in which the heat exchange pipe 131 extends, and transfer heat from the ground to a heating medium that moves along the heat exchange pipe 131, or transfer heat from the heating medium to the ground, so that the heating medium is heat-exchanged.

Since the plurality of heat exchange fins 132 may be individually detachably coupled to the heat exchange pipe 131, the plurality of heat exchange fins 132 may be arranged along the length direction of the heat exchange pipe 131 by varying density thereof, or positions of the arranged plurality of heat exchange fins 132 may be adjusted. Here, the density means the number of heat exchange fins 132 arranged per unit length.

Accordingly, heat exchange efficiency of the heating medium can be maximized by more intensively arranging the plurality of heat exchange fins 132 in a specific portion of the heat exchange pipe 131 in consideration of ground environments of the buried area.

As an example, referring to FIG. 12, when groundwater exists under the ground of the buried area, a density of the plurality of heat exchange fins 132 coupled to the second heat exchange unit U2 which contacts groundwater is greater than a density of the plurality of heat exchange fins 132 coupled to the first heat exchange unit U1 which does not contact groundwater.

Since heat transfer through groundwater is more efficient than heat transfer through the air, an increase in heat transfer area of the second heat exchange unit U2 which contacts groundwater is more efficient than an increase in heat transfer area of the first heat exchange unit U1 which is exposed to the air.

Therefore, to maximize heat exchange efficiency of the second heat exchange unit U2 which contacts groundwater, a greater number of the heat exchange fins 132 may be disposed in the heat exchange pipe 131 of the second heat exchange unit U2 in a concentrated manner, than in the heat exchange pipe 131 of the first heat exchange unit U1 which is exposed to the air. That is, since the density of the heat exchange fins 132 disposed in the heat exchange pipe 131 of the second heat exchange unit U2 is configured to be greater than the density of the heat exchange fins 132 disposed in the heat exchange pipe 131 of the first heat exchange unit U1, the heat exchange efficiency is more effectively improved.

To maximize heat exchange efficiency, the second heat exchange unit U2 contacting groundwater may be formed of a metallic material.

The plurality of heat exchange fins 132 may move in the direction in which the heat exchange pipe 131 extends along the outer circumferential surface of the heat exchange pipe 131.

Therefore, even in a state in which the plurality of heat exchange fins 132 are coupled to the outer circumferential surface of the heat exchange pipe 131, the positions of the heat exchange fins 132 can be adjusted, and a spaced distance between the heat exchange fins 132 can be adjusted.

The heat exchange fins 132 may include a louver structure.

Referring to FIG. 6, the heat exchange fins 132 may include a ring-shaped fin body 132a, a plurality of through-holes 132b formed by cutting at least one or more portions of the fin body 132a, and guide members 132c for guiding the air passing through the plurality of through-holes 132b.

Accordingly, the air in contact with the outer surface of the fin body 132a contacts the inner surface of the fin body 132a and the guide members 132c while being introduced into the plurality of through-holes 132b to thereby perform heat exchange, whereby heat exchange efficiency is improved.

The ground heat exchanger 130a may further include the clamping member 133.

Referring to FIG. 12, at least one or more clamping members 133 are provided along a direction in which the plurality of heat exchange units U1, U2, U3, U4 and U5 extend, and may be coupled to the plurality of heat exchange pipes 131 provided in the plurality of heat exchange units U1, U2, U3, U4 and U5 to separate the plurality of heat exchange pipes 131 from each other.

The ground heat exchanger 130a may further include the water quality measurement sensor 134.

The water quality measurement sensor 134 may be installed in the second heat exchange unit U2 in contact with groundwater, measure groundwater temperature, turbidity, electrical conductivity, residual chlorine, pH and the like, and transmit measurement information to the control device 142 (refer to FIG. 2) provided in the server 140 (refer to FIG. 1).

The ground heat exchanger 130 may further include the sacrificial anode 135.

The sacrificial anode 135 is formed of a metallic material having a lower potential than that of the heat exchange pipe 131 formed of a metallic material such as SUS, and may be electrically connected to the heat exchange pipe 131 and may be corroded in place of the heat exchange pipe 131 by lapse of time.

As described above, according to the exemplary embodiment of the present disclosure, since the heat exchange fins 132 are coupled to the outer circumferential surface of the heat exchange pipe 131 in a screw manner, it is easy to manufacture the heat exchange pipe 131 to improve productivity thereof.

In addition, since the heat exchange fins 132 can be individually coupled to the outer circumferential surface of the heat exchange pipe 131, the plurality of heat exchange fins 132 can be disposed to be spaced apart from each other at equal intervals over the entire portion of the heat exchange pipe 131 along the direction in which the heat exchange pipe 131 extends.

In addition, since the heat exchange fins 132 are configured to be detachable from the outer circumferential surface of the heat exchange pipe 131, the density and positions of the heat exchange fins 132 can be adjusted in one portion of the heat exchange pipe 131, thereby increasing a heat exchange area and maximizing heat exchange efficiency.

In addition, by forming the supply pipe 131a into which a heating medium is introduced from the outside, and the return pipe 131b from which the heating medium that has heat-exchanged flows out, in straight lines, prompt circulation of the heating medium is feasible, whereby it is possible to promptly supply the heat-exchanged heating medium to the at least one facility 20 (refer to FIG. 1).

In the above, preferred embodiments of the present disclosure have been illustrated and described, but the present disclosure is not limited to the specific embodiments described above, and those skilled in the art will appreciate that various modifications are possible, without departing from the scope and spirit of the invention as disclosed in the accompanying claims. Such modifications should not be individually understood from the technical spirit or prospect of the present disclosure.

What is claimed is:

1. An energy supply system, comprising:
    a hot waste water pipe connecting a power plant and at least one facility so as to supply thermal energy to the at least one facility through hot waste water discharged from the power plant;

a ground heat exchanger buried under a ground and connected to the at least one facility so as to supply geothermal energy to the at least one facility;

at least one solar cell module disposed in the at least one facility and supplying electric energy to the at least one facility; and a server configured to individually control the thermal energy, the geothermal energy and the electrical energy supplied to the at least one facility according to an environmental state of the at least one facility.

2. The energy supply system of claim 1, further comprising: a control valve disposed on the hot waste water pipe and controlling a flow rate of the hot waste water, wherein the server is electrically connected to the control valve and controls the control valve to thereby control the flow rate of the hot waste water supplied to the at least one facility.

3. The energy supply system of claim 1, wherein the hot waste water pipe includes, a first transfer pipe through which the hot waste water discharged from the power plant is transferred;

a second transfer pipe which is branched from the first transfer pipe and connected to the at least one facility, and on which the control valve is disposed; and a recovery pipe which transfers the hot waste water recovered from the at least one facility to the power plant.

4. The energy supply system of claim 1, wherein the server includes, a first communication device transmitting and receiving an electrical signal in a wired or wireless manner;

a control device controlling an electrical signal transmitted or received through the first communication device; and an energy storage system storing the electrical signal controlled by the control device.

5. The energy supply system of claim 4, further comprising: a second communication device disposed in the at least one facility and transmitting and receiving an electrical signal to and from the first communication device of the server in a wired or wireless manner.

6. The energy supply system of claim 5, further comprising: a sensor disposed in the at least one facility and sensing information on an environmental state inside the at least one facility to convert it into an electrical signal, wherein the second communication device transmits the electrical signal according to the sensor to the first communication device of the server.

7. The energy supply system of claim 6, wherein the second communication device receives a control signal for controlling the control valve by the server and transmits the control signal to the control valve.

8. The energy supply system of claim 5, further comprising: an energy storage system electrically connected to the second communication device and storing electrical energy generated by the at least one solar cell module.

9. The energy supply system of claim 8, wherein the energy storage system receives electric energy of the power plant.

10. The energy supply system of claim 9, wherein the second communication device transmits a value of an amount of the electric energy stored in the energy storage system to the first communication device of the server, wherein when the value of the amount of the electrical energy stored in the energy storage system is less than a value of a predetermined amount of electrical energy, the first communication device of the server transmits an electrical signal for supplying the electrical energy of the power plant to the energy storage system, to the power plant.

11. The energy supply system of claim 1, wherein the ground heat exchanger includes, a heat exchange pipe which is buried under the ground and in which a heating medium flows; and a plurality of heat exchange fins coupled to the heat exchange pipe and disposed to be spaced apart from each other along a direction in which the heat exchange pipe extends.

* * * * *